United States Patent
Zhang et al.

(10) Patent No.: US 12,512,633 B2
(45) Date of Patent: Dec. 30, 2025

(54) POWER TRACK SYSTEM WITH LEAKAGE CURRENT PROTECTION FUNCTION

(71) Applicant: Chengli Li, Suzhou (CN)

(72) Inventors: Xiaoming Zhang, Suzhou (CN); Chengli Li, Suzhou (CN); Minghu Bao, Suzhou (CN)

(73) Assignee: Chengli Li, Suzhou (CN)

( * ) Notice: Subject to any disclaimer, the term of this patent is extended or adjusted under 35 U.S.C. 154(b) by 388 days.

(21) Appl. No.: 18/357,862

(22) Filed: Jul. 24, 2023

(65) Prior Publication Data

US 2025/0015545 A1 Jan. 9, 2025

(30) Foreign Application Priority Data

Jul. 4, 2023 (CN) .................. 202310809876.X
Jul. 4, 2023 (CN) .................. 202321729580.9

(51) Int. Cl.
*H01R 13/713* (2006.01)
*G01R 31/52* (2020.01)
*H01R 13/66* (2006.01)

(52) U.S. Cl.
CPC .......... *H01R 13/713* (2013.01); *G01R 31/52* (2020.01); *H01R 13/6683* (2013.01)

(58) Field of Classification Search
None
See application file for complete search history.

(56) References Cited

U.S. PATENT DOCUMENTS

| | | | |
|---|---|---|---|
| 8,491,343 B2* | 7/2013 | Wang | H01R 25/006 439/640 |
| 9,325,132 B2* | 4/2016 | Hsu | H01R 25/003 |
| 9,608,392 B1* | 3/2017 | Destro | H01R 9/26 |
| 9,906,012 B2* | 2/2018 | Gao | H02H 3/162 |
| 11,146,019 B1* | 10/2021 | Hunnicutt | H01R 25/142 |
| 11,469,559 B2* | 10/2022 | Rafferty | H01R 25/145 |
| 2009/0256661 A1* | 10/2009 | Li | H01R 13/7135 361/42 |

* cited by examiner

*Primary Examiner* — Tho D Ta
(74) *Attorney, Agent, or Firm* — Chen Yoshimura LLP

(57) ABSTRACT

A power track system includes a leakage current protection assembly, a track board, and track sockets slidably disposed on the track board. The leakage current protection assembly includes an input end for coupling to a power source and an output end coupled to electrical conductors within the track board to provide electrical power to the track board. The track board is electrically coupled to the track sockets to provide power thereto. The track sockets have socket holes to receive an electrical plug of a load, and is slidable to different positions of the track board. The leakage current protection assembly functions to cut off electrical connection between the input and output ends when any one of the track board, track sockets and load has a leakage fault that exceeds a threshold value. The power track system can provide leakage current protection function while supplying power to the loads.

10 Claims, 7 Drawing Sheets

POWER TRACK SYSTEM WITH LEAKAGE CURRENT PROTECTION FUNCTION

BACKGROUND OF THE INVENTION

This invention relates to electrical appliances, and in particular, it relates to power track systems.

With the increased demand for convenience in homes, power track systems have been commercially available for home installation. These are power strips formed of a track board and track sockets (power outlet sockets) that can freely slide along a guide track of the track board. Power track systems can be equipped with a desired number of track sockets depending on the user's need, and the track sockets can be positioned at desired locations along the track board, making the device versatile and attractive.

However, some power track systems have safety issues. In most currently available power track systems, an electrified electrical conductor is provided inside the relatively long track (guide groove) of the track board to supply power. Because the track sockets must be able to slide along the guide groove, the guide groove cannot be completely sealed. This increases the possibility of electrical shock to the user.

Further, in most currently available power track systems, the track board housing is made of aluminum on the surface. After long time use, the housing of the power track system may be electrically charged, which is unsafe. Moreover, for convenience, power track systems are sometimes installed near the baseboard of the room; small children may accidentally touch them, and they can come in contact with water during cleaning, which greatly impacts their safety.

SUMMARY OF THE INVENTION

Therefore, improved power track systems are needed.

Accordingly, the present invention is directed to a power track system that substantially obviates one or more of the problems due to limitations and disadvantages of the related art.

In a first aspect, the present invention provides a power track system, which includes: a leakage current protection assembly; a track board, including a housing and electrical conductors within the housing; and one or more track sockets slidably disposed on the track board, wherein the leakage current protection assembly includes an input end configured to be coupled to a power source, and an output end coupled to the electrical conductors within the track board and configured to provide an electrical power to the track board, wherein the track board is configured to be electrically coupled to the track sockets and to provide an electrical power to the track sockets, wherein each of the one or more track sockets has socket holes on a front surface configured to receive an electrical plug of a load, and is slidable to different positions of the track board, and wherein the leakage current protection assembly is configured to cut off an electrical connection between the input end and the output end when any one of the track board, track sockets and load has a leakage fault that exceeds a threshold value.

In some embodiments, the leakage current protection assembly includes at least one reset operating element, configured to reset the electrical connection between the input end and the output end.

In some embodiments, the at least one reset operating element is disposed on a surface of a housing of the leakage current protection assembly.

In some embodiments, the leakage current protection assembly includes at least one test operating element, configured to generate a simulated leakage current to test whether the leakage current protection assembly is functioning normally.

In some embodiments, the at least one test operating element is disposed on a surface of a housing of the leakage current protection assembly.

In some embodiments, the leakage current protection assembly is disposed within the housing of the track board, forming an integral part of the track board.

In some embodiments, the leakage current protection assembly includes a housing, which is formed separately from the housing of the track board and is removably attached to it.

In some embodiments, the leakage current protection assembly includes a housing, which is formed separately from the housing of the track board and is fixedly attached to it.

In some embodiments, each track socket includes at least one electrical conductor block disposed on a rear surface of the track sockets.

In some embodiments, the track board further includes at least one guide groove, configured to accommodate the at least one conductor block, allowing the conductor block to contact the electrical conductors of the track board and guiding a sliding motion of the conductor blocks along the guide groove.

In embodiments of the present invention, by employing the leakage current protection assembly, the power track system can provide leakage current protection function while supplying power to the load. This provide convenience to the user and ensures safety.

BRIEF DESCRIPTION OF DRAWINGS

Preferred embodiments of the present invention are described with reference to the drawings. These drawings explain the embodiments and their operating principle, and only illustrate structures that are necessary to the understanding of the invention. These drawings are not to scale. In the drawings, like features are designated by like reference symbols.

DETAILED DESCRIPTION OF THE INVENTION

Figure 1:
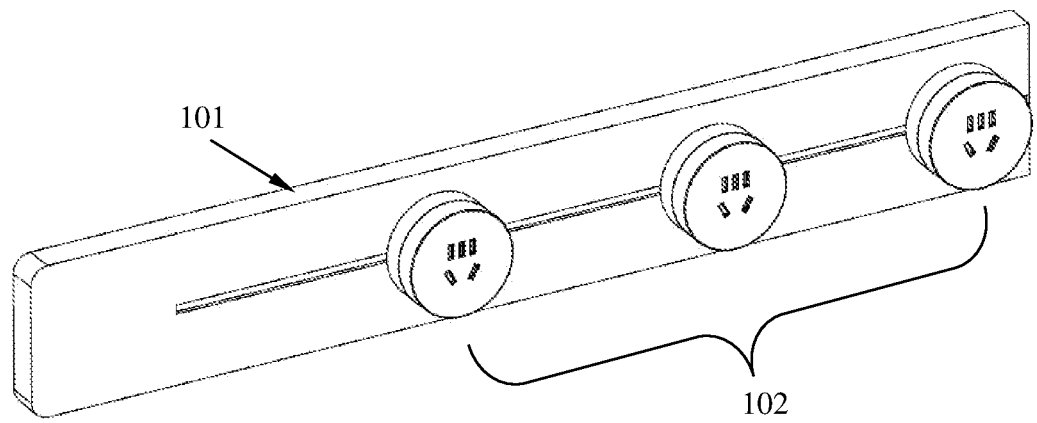
FIG. 1 illustrates a conventional power track system.

Preferred embodiments of the present invention are described below with reference to the drawings. These drawings and descriptions explain embodiments of the invention but do not limit the invention. The described embodiments are not all possible embodiments of the present invention. Other embodiments are possible without departing from the spirit and scope of the invention, and the structure and/or logic of the illustrated embodiments may be modified. Thus, it is intended that the scope of the invention is defined by the appended claims. In the following descriptions, directional terms such as up, down, left, right, front, rear, etc. are relative terms with reference to the orientation of the drawing figures; these terms are used for better understanding of the invention, but they do not limit the scope of the invention.

Before describing the embodiments, some terms used in this disclosure are defined here to help the reader better understand this disclosure.

In this disclosure, terms such as "connect", "couple", "link" etc. should be understood broadly, without limitation to physical connection or mechanical connection, but can include electrical connection, and can include direct or indirection connections. Terms such as "a" and "one" do not limit the quantity, and refers to "at least one".

In the descriptions below, terms such as "including" are intended to be open-ended and mean "including without limitation", and can include other contents. "Based on" means "at least partly based on." "An embodiment" means "at least one embodiment." "Another embodiment" means "at least another embodiment," etc. In this disclosure, the above terms do not necessarily refer to the same embodiments. Further, the various features, structures, materials or characteristics may be suitably combined in any of the one or more embodiments. Those of ordinary skill in the art may combine the various embodiments and various characteristics of the embodiments described herein when they are not contrary to each other.

FIG. 1 illustrates a conventional power track system 100. The power track system 100 includes a track board 101 and a plurality of track sockets (power outlet sockets) 102 which are slidably disposed on the track board 101. The track board 101 is electrically coupled to a power supply, and electrically coupled to the track sockets 102, so as to supply power to the track sockets 102 and electrical loads plugged into the track sockets 102. However, as discussed earlier, in such a power track system, an electrified electrical conductor is provided inside the guide groove of the track board 101, which increases the possibility of electrical shock to the user. Or, when such a power track system is installed near the baseboard of the room, they may be touched by small children, and can come in contact with water during cleaning, which greatly impacts its safety.

Figure 2:
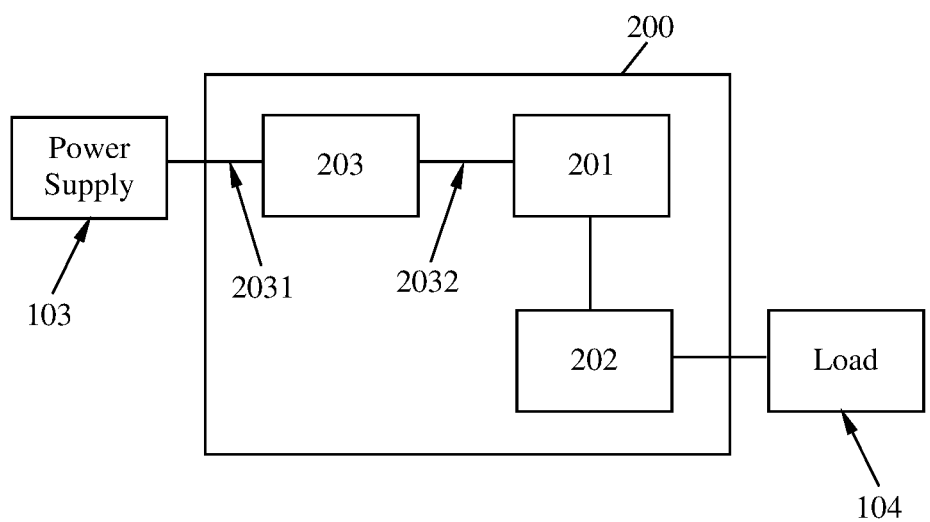
FIG. 2 is a block diagram illustrating a power track system according to an embodiment of the present invention.

FIG. 2 is a block diagram illustrating a power track system 200 according to an embodiment of the present invention. The power track system 200 includes a track board 201 and a plurality of (e.g., 3 in the illustrated embodiment) track sockets (power outlet sockets) 202 slidably disposed on the track board 201 along a guide groove. The power track system 200 further includes a leakage current protection assembly 203. The leakage current protection assembly 203 has an input end 2031 electrically coupled to a power supply 103, and an output end 2032 electrically coupled to electrical conductors inside the guide groove of the track board 201 for supplying power to the track board 201. The electrical conductors are electrically coupled to the track sockets 202 to supply power to the track sockets. The track sockets 202 have socket holes and are configured to receive an electrical plug of a load 104 plugged into the socket holes to supply power to the load 104. The track sockets 202 may slide along the guide groove to different locations of the track board 201.

Figure 3:
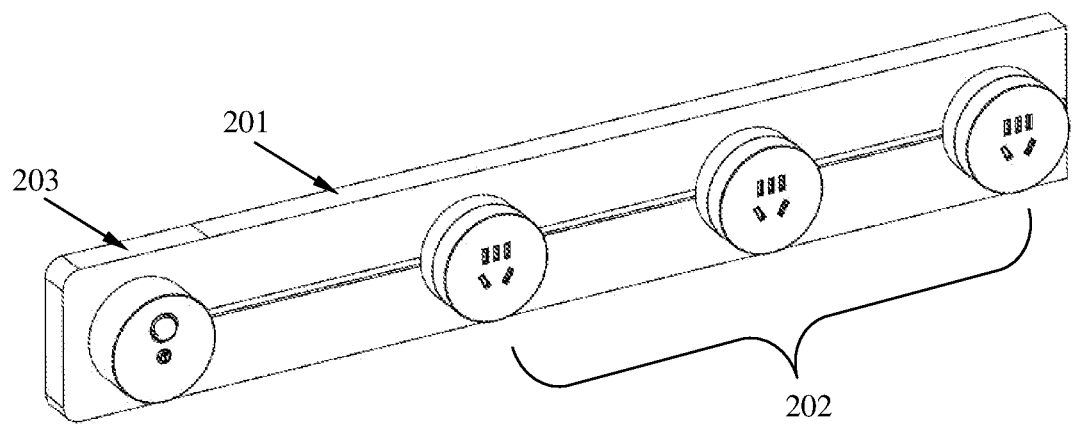
FIG. 3 illustrates a power track system according to an embodiment of the present invention where the track sockets are installed on the track board.
Figure 4:
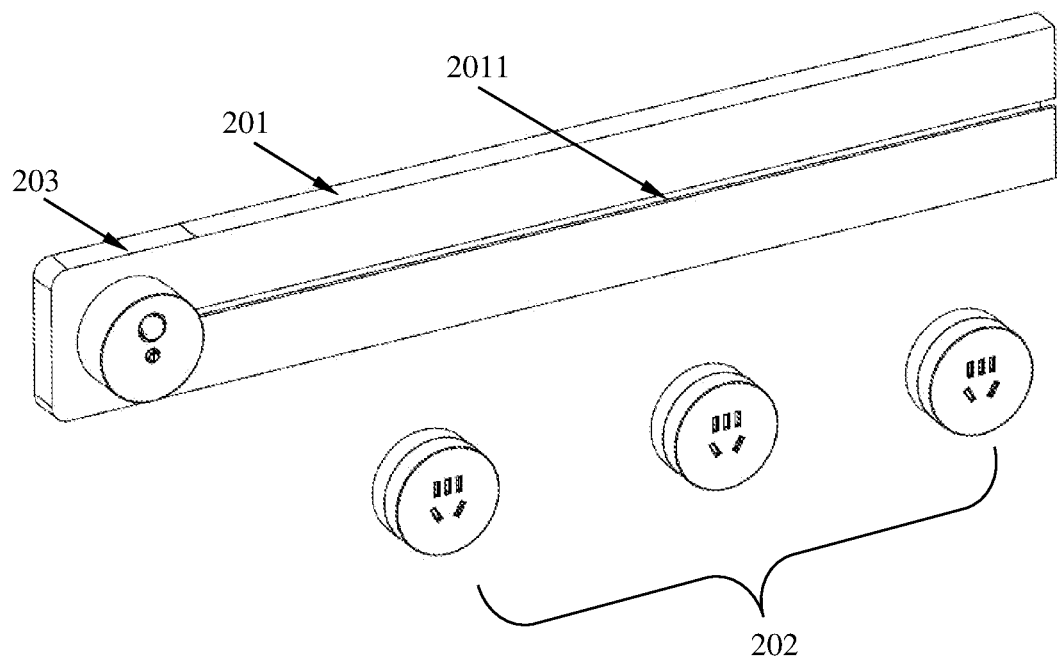
FIG. 4 illustrates a power track system according to an embodiment of the present invention where the track sockets are uninstalled from the track board.
Figure 5:
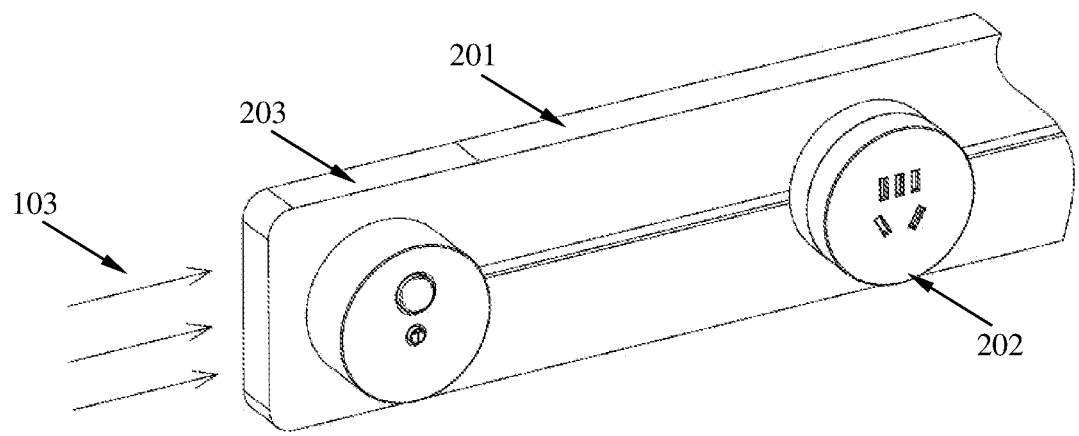
FIG. 5 illustrates the electrical connection of a power track system according to an embodiment of the present invention.
Figure 6:
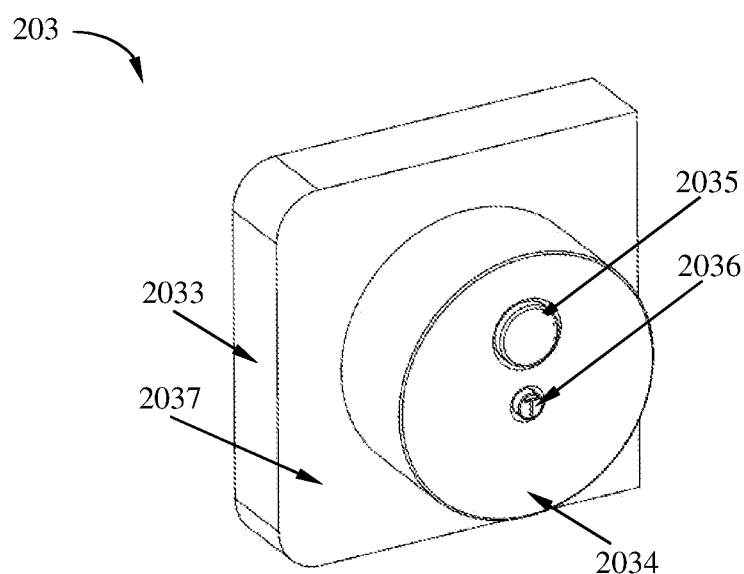
FIG. 6 illustrates a leakage current protection device of a power track system according to an embodiment of the present invention.
Figure 7:
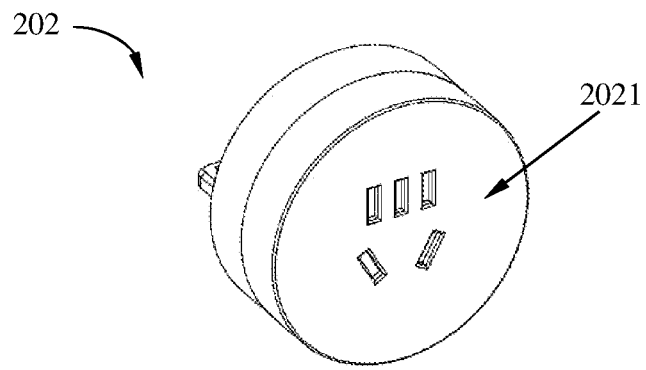
FIG. 7 illustrates a track socket for a power track system according to an embodiment of the present invention.
Figure 8:
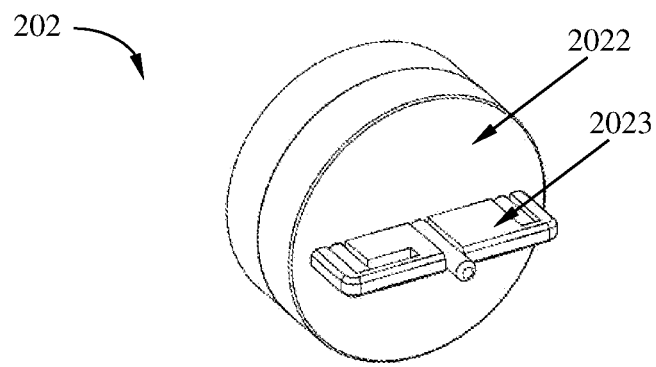
FIG. 8 illustrates another view of the track socket.

The power track system 200 and its components are described with reference to FIGS. 3-8. FIG. 3 illustrates the power track system 200 where the track sockets are installed on the track board. FIG. 4 illustrates the power track system 200 where the track sockets 202 are uninstalled from the track board. FIG. 5 illustrates the electrical connection of the power track system. FIG. 6 illustrates a leakage current protection device 203 of the power track system. FIG. 7 illustrates an exemplary track socket 202. FIG. 8 illustrates another view of the track socket 202.

As shown in FIGS. 3 and 4, the track sockets 202 is slidably disposed on the track board 201, and may be installed to or uninstalled from the track board 201 (for example, one end of the track board 201 may be open to facilitate installation and uninstallation). Thus, the user may install a desired number of track sockets 202 onto the track board 201.

As shown in FIGS. 3-6, unlike the conventional power track system 100, the power track system 200 according to embodiments of the present invention further includes a leakage current protection assembly 203. As shown in FIGS. 3 and 4, the leakage current protection assembly 203 may be disposed at one end of the track board 201; the input end 2031 of the leakage current protection assembly 203 is coupled to the main power supply lines, and its output end 2032 is couple to the track board 201. The leakage current protection assembly 203 provides leakage current protection to the track board 201, the track sockets 202 installed on the track board 201, and the load 104 plugged into the track sockets 202 while supplying power to them. More specifically, the leakage current protection assembly 203 is configured to cut off the electrical connection between the input end 2031 and output end 2032 when any one of the track board 201, track sockets 202 and load 104 has a leakage fault that exceeds a threshold value, to cut off power to these components, thereby protecting the user. For example, when at least one of the track board 201, track sockets 202, and load 104 has a leakage fault, the leakage current protection assembly 203 detects the leakage fault by detecting a change in the current or voltage on the power supply lines between the input end 2031 and output end 2032. When the leakage fault exceeds a threshold (e.g., exceeds a leakage current threshold or a leakage voltage threshold), the leakage current protection assembly 203 disconnects the electrically connection between the input end 2031 and the output end 2032, for example, by operating a switch located between the input and output ends.

The leakage current protection assembly 203 may be one that is known in the art, for example, those described in Chines patent application publication No. CN115347530 A, published Nov. 15, 2022, entitled "Leakage current protection device, electrical connector and appliance," or one that is developed and becomes available in the future, as long as it can perform the function of disconnecting the electrical connection between the input end 2031 and output end 2032 when any one of the track board 201, track sockets 202 and load 104 has a leakage fault exceeding a threshold value.

As shown in FIG. 6, the leakage current protection assembly 203 includes a housing 2033, which may be formed integrally with the housing of the track board 201 (i.e., the leakage current protection assembly 203 is disposed within the housing of the track board 201, forming an integral part of the track board 201), or formed separately from the housing of the track board 201 and attached to it (either removably or fixedly attached).

As shown in FIG. 6, the leakage current protection assembly 203 further includes at least one user-operable reset operating element 2035 (one is shown in the figure as an example), configured to reset the electrical connection between the input end 2031 and output end 2032. For example, the leakage current protection assembly 203 may have two states: the first is a tripped state, where input contact terminals and output contact terminals within the leakage current protection assembly 203 are disconnected from each other. In this state, the output end 2032 of the leakage current protection assembly 203 and the downstream track board 201 have not power output. The second is a reset state, where the input contact terminals and output contact terminals within the leakage current protection assembly 203 are connected to each other. In this state, the output end 2032 of the leakage current protection assembly 203 and the downstream track board 201 have power output. By manually operating the reset operating element 2035, the leakage current protection assembly 203 can be reset to the reset state. For example, the reset operating element 2035 may be a reset switch described in the above-mentioned application CN115347530 A, or similar assemblies with a reset function, either known in the art or to be developed in the future.

As shown in FIG. 6, the leakage current protection assembly 203 further includes at least one user-operable test operating element 2036 (one is shown in the figure as an example), configured to generate a simulated leakage current in the power supply lines, which operates to test whether the leakage current protection assembly 203 is functioning normally. By manually operating the reset operating element 2035, the leakage current protection assembly 203 is put in a reset state; at this time, by operating the test operating element 2036, the leakage current protection assembly 203 has a simulated leakage fault, to test whether the leakage current protection assembly 203 can detect the leakage fault and perform a trip action to trip the leakage current protection assembly 203. For example, the test operating element 2036 may be a test button described in Chines patent application publication No. CN201181681Y, published Jan. 14, 2009, entitled "Trip assembly and a power receptable having leakage current protection function employing such a trip assembly," or similar assemblies with a test function, either known in the art or to be developed in the future.

In the embodiment shown in FIGS. 3-6, the front surface 2037 of the housing 2033 of the leakage current protection assembly 203 is provided with a protruding operation platform 2034 (which is a round shape in the illustrated embodiment, but is not limiter thereto), and the reset operating element 2035 and test operating element 2036 are disposed on the platform 2034. In other embodiments, the operation platform may be located on other surface areas of the housing of the leakage current protection assembly 203.

As shown in FIG. 4, the track board 201 has at least one guide groove 2011 (one is shown in the figure as an example), configure to supply power to the track sockets 202 and to guide the sliding movement of the track sockets 202 along the guide groove 2011 (e.g., to slide back and forth repeatedly). Electrical conductors inside the guide groove 2011 (e.g., electrical conductor plates) are electrically coupled to the output end 2032 of the leakage current protection assembly 203, to obtain electrical power from the power supply 103.

As shown in FIG. 6, the track sockets 202 has a front surface (socket hole surface) 2021 (which are round in the figure as an example), for the load 104 to be plugged in. The track sockets 202 further has a rear surface 2022 opposite to the front surface 2021, which is provided with at least one electrical conductor block 2023 to draw power. The guide groove 2011 of the track board 201 can accommodate at least one conductor block 2023, allowing it to contact the electrical conductors within the guide groove 2011 and guiding the sliding motion of the conductor block 2023 along the guide groove 2011. The electrical conductor block may be an assembly either known in the art or to be developed in the future.

Figure 9:
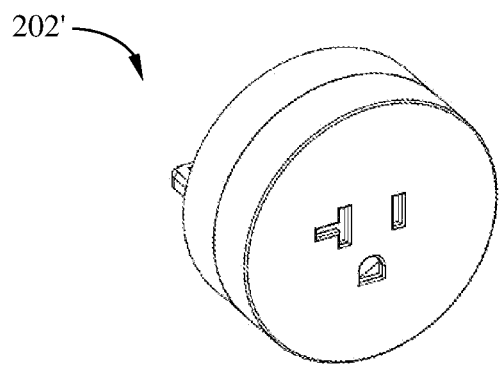
FIG. 9 illustrates another track socket for a power track system according to an embodiment of the present invention.
Figure 10:
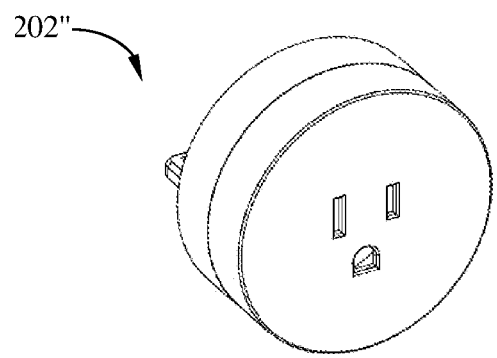
FIG. 10 illustrates another track socket for a power track system according to an embodiment of the present invention.
Figure 11:
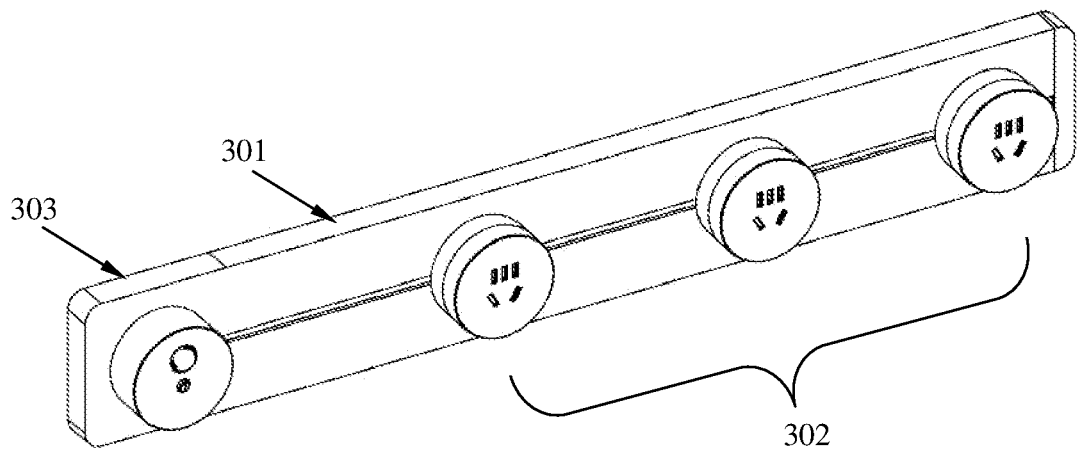
FIG. 11 illustrates another power track system according to an embodiment of the present invention.
Figure 12:
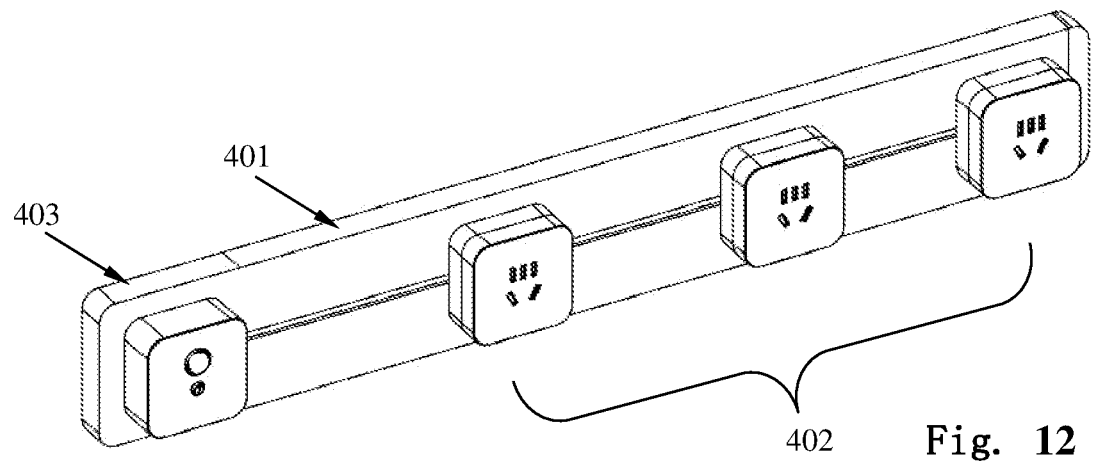
FIG. 12 illustrates another power track system according to an embodiment of the present invention.
Figure 13:
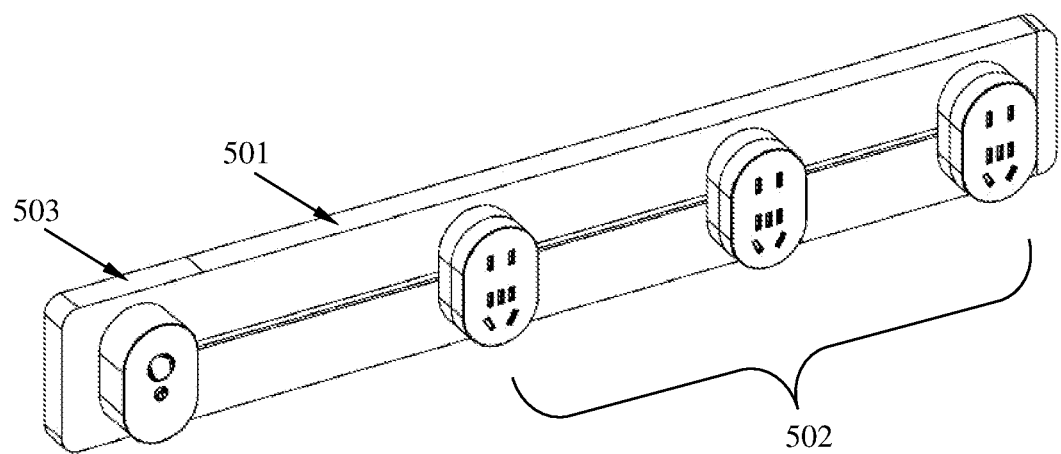
FIG. 13 illustrates another power track system according to an embodiment of the present invention.
Figure 14:
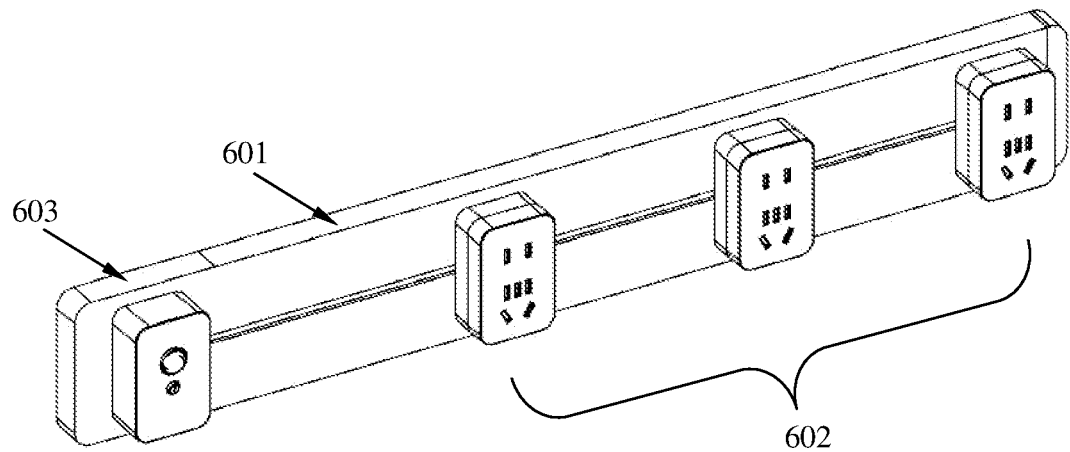
FIG. 14 illustrates another power track system according to an embodiment of the present invention.

FIG. 9 illustrates another track socket 202' for a power track system according to another embodiment of the present invention. FIG. 10 illustrates another track socket 202" for a power track system according to another embodiment of the present invention. The track sockets 202' and 202" have similar functions as the track sockets 202, except for the socket hole configurations. For example, the track sockets 202' and 202" are respectively standard 5-15P and 5-20P receptacles commonly used in the U.S. In other embodiments, the track sockets 202 may be replaced by any sockets meeting any standards, including USB charging outlets.

FIGS. 11 to 14 respectively illustrate power track systems 300, 400, 500 and 600 according to other embodiments of the present invention. The power track systems 300, 400, 500 and 600 respectively have track boards 301, 401, 501 and 601 similar to the track board 201 of the power track system 200, track sockets 302, 402, 502 and 602 similar to the track sockets 202 of the power track system 200, and leakage current protection assemblies 303, 403, 503 and 603 similar to the leakage current protection assembly 203 of the power track system 200. In the embodiments of FIGS. 11-14, the respective front surfaces of the operation platforms of the leakage current protection assemblies 303, 403, 503 and 603 are respectively round, square with round corners, oval (or racetrack shaped), and rectangle with round corners. Similarly, the front surfaces of the track sockets 302, 402, 502 and 602 have these respective shapes. It should be understood that the operation platforms of the leakage current protection assemblies and the front surfaces of the track sockets can have other shapes.

Further, in these embodiments, the leakage current protection assembly may be disposed at one end of the track board, and the other end of the track board may be provided with a removeable enclosure unit to close the end of the guide groove. The removeable enclosure unit may be removed from the end of the track board by the user, in order to install or uninstall the track sockets, and then re-attached to the end of the track board to close the end of the guide groove to prevent the track sockets from sliding out of the track board.

Figure 15:
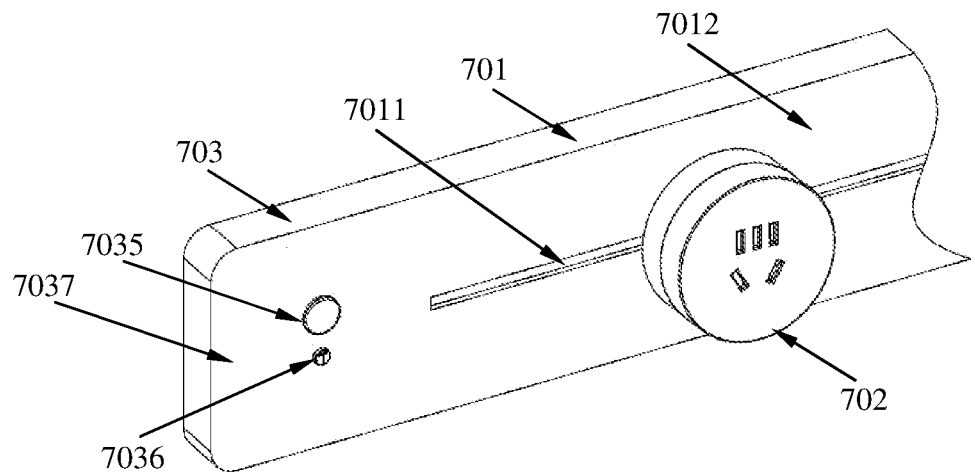
FIG. 15 illustrates a part of another power track system according to an embodiment of the present invention.

FIG. 15 illustrates a part of another power track system 700 according to an embodiment of the present invention. The power track system 700 includes a track board 701 similar to the track board 201 of the power track system 200, track sockets 702 similar to the track sockets 202 of the power track system 200, and a leakage current protection assembly 703 similar to the leakage current protection assembly 203 of the power track system 200. The track sockets 702 are slidably installed in the guide groove 7011 which is similar to the guide groove 2011 of the power track system 200. Unlike the leakage current protection assembly 203, the leakage current protection assembly 703 does not have a protruding operation platform. Rather, the at least one reset operating element 7035 and at least one test operating element 7036 are disposed on the front surface 7037 of the housing of the leakage current protection assembly 703. In the embodiment of FIG. 15, the front surface 7037 of the housing of the leakage current protection assembly 703 is flush with the front surface 7012 of the track board 701. In other embodiments, the front surface 7037 is not flush with the front surface 7012.

Figure 16:
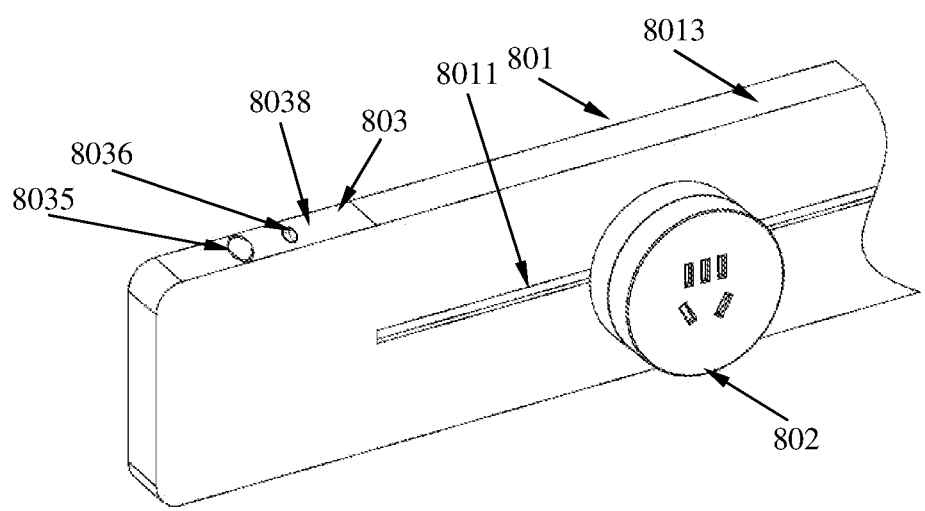
FIG. 16 illustrates a part of another power track system according to an embodiment of the present invention.

FIG. 16 illustrates a part of another power track system 800 according to an embodiment of the present invention. The power track system 800 includes a track board 801 similar to the track board 201 of the power track system 200, track sockets 802 similar to the track sockets 202 of the power track system 200, and a leakage current protection assembly 803 similar to the leakage current protection assembly 203 of the power track system 200. The track sockets 802 are slidably installed in the guide groove 8011 which is similar to the guide groove 2011 of the power track system 200. Unlike the leakage current protection assembly 203, the leakage current protection assembly 803 does not have an operation platform. Rather, the at least one reset operating element 8035 and at least one test operating element 8036 are disposed on a side surface 8038 of the housing of the leakage current protection assembly 803. In the embodiment of FIG. 16, the side surface 8038 of the housing of the leakage current protection assembly 803 is flush with the side surface 8013 of the track board 801 (perpendicular to the front surface where the guide groove is located). In other embodiments, the side surface 8038 is not flush with the side surface 8013. It should be understood that the front surface (and the side surface) of the track board may face up or sideways depending on how the power track system is installed.

It should be understood that the reset operating element and test operating element are disposed on the surfaces of the leakage current protection assembly; they may be both disposed on the front or the side surfaces (or other surfaces) of the housing of the leakage current protection assembly, or be disposed on different surfaces (any suitable surfaces) of the housing of the leakage current protection assembly. For example, the reset operating element may be disposed on the front surface and the test operating element may be disposed on the side surface of the housing, or vice versa.

While the present invention is described above using specific examples, these examples are only illustrative and do not limit the scope of the invention. It will be apparent to those skilled in the art that various modifications, additions and deletions can be made to the power track system device of the present invention without departing from the spirit or scope of the invention.

The invention claimed is:

1. A power track system, comprising:
a leakage current protection assembly;
a track board, including a housing and electrical conductors within the housing; and
one or more track sockets slidably disposed on the track board,
wherein the leakage current protection assembly includes an input end configured to be coupled to a power source, and an output end coupled to the electrical conductors within the track board and configured to provide an electrical power to the track board,
wherein the track board is configured to be electrically coupled to the track sockets and to provide an electrical power to the track sockets,
wherein each of the one or more track sockets has socket holes on a front surface configured to receive an electrical plug of a load, and is slidable to different positions of the track board,
wherein the leakage current protection assembly is configured to cut off an electrical connection between the input end and the output end when any one of the track board, track sockets and load has a leakage fault that exceeds a threshold value, and
wherein the leakage current protection assembly includes a housing, which is formed separately from the housing of the track board, and is either removably attached to or fixedly attached to the housing of the track board.

2. The power track system of claim 1, wherein the leakage current protection assembly includes at least one reset operating element, configured to reset the electrical connection between the input end and the output end.

3. The power track system of claim 2, wherein the at least one reset operating element is disposed on a surface of the housing of the leakage current protection assembly.

4. The power track system of claim 1, wherein the leakage current protection assembly includes at least one test operating element, configured to generate a simulated leakage current to test whether the leakage current protection assembly is functioning normally.

5. The power track system of claim 4, wherein the at least one test operating element is disposed on a surface of the housing of the leakage current protection assembly.

6. The power track system of claim 1, wherein each track socket includes at least one electrical conductor block disposed on a rear surface of the track sockets.

7. The power track system of claim 6, wherein the track board further includes at least one guide groove, configured to accommodate the at least one conductor block, allowing the conductor block to contact the electrical conductors of the track board and guiding a sliding motion of the conductor blocks along the guide groove.

8. A power track system, comprising:
a leakage current protection assembly;
a track board, including a housing and electrical conductors within the housing; and
one or more track sockets slidably disposed on the track board,
wherein the leakage current protection assembly includes an input end configured to be coupled to a power source, and an output end coupled to the electrical conductors within the track board and configured to provide an electrical power to the track board, wherein the track board is configured to be electrically coupled to the track sockets and to provide an electrical power to the track sockets, and further includes a guide groove which is located on a front surface of the housing of the track board and configured to partially accommodate the one or more track sockets, wherein each of the one or more track sockets has socket holes on a front surface configured to receive an electrical plug of a load, and is slidable along the guide groove to different positions of the track board, wherein the leakage current protection assembly is configured to cut off an electrical connection between the input end and the output end when any one of the track board, track sockets and load has a leakage fault that exceeds a threshold value, wherein the leakage current protection assembly is disposed within the housing of the track board, forming an integral part of the track board, and the leakage current protection assembly includes a reset operating element and a test operating element which are located either on the front surface of the housing of the track board or on a side surface of the housing of the track board perpendicular to the front surface.

9. The power track system of claim 8, wherein each track socket includes at least one electrical conductor block disposed on a rear surface of the track sockets.

10. The power track system of claim 9, wherein the guide groove of the track board is configured to accommodate the at least one conductor block, allowing the conductor block to contact the electrical conductors of the track board and guiding a sliding motion of the conductor blocks along the guide groove.

* * * * *